(12) United States Patent
Bottero et al.

(10) Patent No.: US 6,711,468 B2
(45) Date of Patent: Mar. 23, 2004

(54) CONTROL SYSTEM FOR ROBOTS

(75) Inventors: Aldo Bottero, Turin (IT); Luciano Cane, Turin (IT); Giorgio Cantello, Turin (IT); Guido Cargnino, Turin (IT); Antonio Zaccagnini, Turin (IT)

(73) Assignee: Comau S.p.A., Turin (IT)

( * ) Notice: Subject to any disclaimer, the term of this patent is extended or adjusted under 35 U.S.C. 154(b) by 0 days.

(21) Appl. No.: 10/163,044

(22) Filed: Jun. 4, 2002

(65) Prior Publication Data

US 2002/0188381 A1 Dec. 12, 2002

(30) Foreign Application Priority Data

Jun. 8, 2001 (IT) ..................................... TO2001A0553

(51) Int. Cl.$^7$ ............................................. G06F 19/00
(52) U.S. Cl. ...................... 700/245; 700/247; 700/248; 700/246; 700/251; 700/253; 700/256; 700/261; 318/568.1; 318/568.11; 318/568.12; 318/568.15; 318/568.16; 318/568.17; 318/568.19; 901/9; 901/23; 901/29; 901/46; 901/47
(58) Field of Search ................................ 700/245, 246, 700/247, 251, 253, 256, 260, 261, 108, 109, 110, 163, 193, 95, 248, 259; 318/568.1, 568.11, 586.12, 568.16, 568.17, 568.2, 568.15, 573, 568.19; 701/23; 219/121.76; 901/9, 23, 29, 47, 46

(56) References Cited

U.S. PATENT DOCUMENTS 4,876,494 A * 10/1989 Daggett et al. ......... 318/568.22
4,990,839 A * 2/1991 Schonlau ..................... 700/248
5,202,613 A * 4/1993 Kruse .......................... 318/254
5,321,342 A * 6/1994 Kruse .......................... 318/254
5,766,016 A * 6/1998 Sinclair et al. ............. 434/262
5,936,240 A * 8/1999 Dudar et al. ................ 250/253
6,356,806 B1 * 3/2002 Grob et al. .................. 700/245
6,438,454 B1 * 8/2002 Kuroki ........................ 700/245
6,555,784 B2 * 4/2003 Iehisa et al. ........... 219/121.76

OTHER PUBLICATIONS

Afzulpurkar et al., Adaptive linear robot control for tracking and grasping a dynamic object, 2002, ppl. 578–583.*

KKUKA, control cabinet, 1998, pp. 1–22.*

* cited by examiner

Primary Examiner—William A. Cuchlinski, Jr.
Assistant Examiner—McDieunel Marc
(74) Attorney, Agent, or Firm—Dorsey & Whitney LLP

(57) ABSTRACT

A control system for robots comprising a control unit for generating and controlling the paths of a movement of the moving parts of the robot, a drive unit for generating the control signals for controlling the motors associated to the moving parts of the robot, and an Ethernet-type network for connection of the control unit and the drive unit. An interface module is also provided to connect the control unit to peripheral units and distributed input/output units. The drive unit comprises, in conjunction with a plurality of CPUs that close the control loops of the torques generated by the individual motors, a main CPU responsible for position control in the framework of the drive unit. The latter CPU thus retains knowledge of the overall status of the machine.

15 Claims, 2 Drawing Sheets

PRIOR ART

CONTROL SYSTEM FOR ROBOTS

CROSS REFERENCE TO RELATED APPLICATIONS

This application claims priority under 35 U.S.C. §119 to Italian Application Serial No. TO2001A000553, entitled "Control System for Robots" and filed on Jun. 8, 2001, naming Aldo Bottero, Luciano Cane, Giorgio Cantello, Guido Cargnino, and Antonio Zaccagnini as inventors, the specification of which is hereby incorporated by reference in its entirety.

TECHNICAL FIELD

The present invention relates generally to control systems for robots, and more particularly to a control system for industrial robots.

BACKGROUND OF THE INVENTION

A control system for robots of a classic type can be represented in a general and synthetic way by three functional blocks.

A first block is represented by the supervising or monitoring function. This carries out automation of the system by executing the user program. It receives at input and generates at output signals of a logic type, which enable management of the system and of the corresponding diagnostic and safety functions. It communicates with other control units (factory automation) or additional cards (cell automation), receiving information that conditions execution of the application program.

A second block is represented by the function for generation and control of the movement. When it receives requests for movement from the user program, it performs generation of the paths of movement and (possibly) torque for the motors of the system and communicates with the regulating functions.

Finally, a third block is represented by the regulating function. This receives the position and torque paths, measures the angular/linear positions of the motors present in the system and calculates the electric currents to be sent to the various motors in order to guarantee execution of the user program within the times envisaged and with the required accuracy. This functional block manages generation of the power signals and interfaces with the measuring instrumentation.

The above functional structure is general and representative of practically all the controls for robots currently present on the market. The various products are differentiated by the particular make-up of the architecture that they present.

Normally, the system architecture that implements the three functions mentioned above envisages the use of three levels of processors, which communicate with one another in various ways:

- a main control unit which performs the function of supervision;
- one or more units for performing the function of generation and control of movement; and
- one or more units for controlling the system by measuring the angular/linear positions of the actuators and by generating conditioning signals for the drives.

Transmission of information between the various functional blocks within the times and in the modes required is what guarantees proper execution of the system. The communication between the various control units is characterized by different levels of priority and complexity and by more stringent time constraints, as the generation of the power signals is approached.

Of particular importance for its impact on machine performance in terms of movement is the communication between the control unit that manages the generation of the position path and the units that perform control of position and torque of the motors.

The path generator receives from the interpreter of the application program user requests for movement and calculates the displacement in cartesian space of the end point of the kinematic chain. This point coincides with the equipment necessary for the particular application. The description of the geometry of the machine (kinematics) makes it possible to calculate, starting from the Cartesian displacement requested, the joint paths (angular positions) for the motors.

The above paths are calculated according to points and communicated to the calculation units that carry out position control of the motors. The number of points that describe and constrain the path in the joint space (evolution in time of the angular positions of the motors) conditions the accuracy and the rapidity with which the robotic arm follows the Cartesian path.

As the number of points increases, the resolution with which the path is described increases and the interval of time that elapses between two adjacent points decreases. This contributes to reducing the delays between the generation of the path and the actual position of the machine.

As the number of points increases, the number of variables transmitted in unit time increases.

In addition to the paths of the desired angular positions, the calculation units responsible for position control receive (and transmit) information which enables:

- verification of execution of the movement in progress;
- adjustment of regulation of the motors according to the working conditions (for example, the precalculated values of the balancing currents of the torque applied to the axes by gravity); and
- management of system diagnostics.

There thus emerges clearly the importance and critical nature of the communication between the function of generation of the path position desired and the closed-loop function for control and regulation of the actual position.

Owing to the large amount of information required for making the communication between the two functional levels, the solutions so far proposed in the art are numerous.

With a certain degree of simplification, but with substantial adherence to the actual situation, these known solutions fall within two basic reference architectures.

One first solution which has been widely used in the past is illustrated in the block diagram of FIG. 1.

According to this solution, two central processing units (CPUs) 1 and 2, one dedicated to planning paths, the other dedicated to position control, communicate with one another via a bus (for example, a Vesa Module Europa (VME) bus) or via a shared memory (for example, a dual-port random access memory (RAM)), whilst the current references and the positions measured form two signal buses (in general, analog signals) 3, 4 that connect drives 5.1, . . . . 5.n and motors 6.1, . . . , 6.n to the control electronics through the demux/mux blocks 3a and 4a. This solution affords the advantage of connecting the two CPUs 1, 2 together by means of dedicated and fast communication channels (at times the two CPUs are on the same card).

The main disadvantages of the above solution are the following:

whilst the communication channel between the CPUs is dedicated and readily performs a "point-to-point" connection, it is not, however, in itself a "multipoint" communication channel; and the buses of the analog signals are costly (they require a dedicated hardware for the conditioning of the signals) and are far from immune from disturbance.

A variant of the architecture represented in FIG. 1 envisages the use of drives that in part provide interlocking functions (control of speed of the motor). In this case, even though the drives are digital (with a CPU on board that performs the functions of speed control), the signals sent to the drives are analog signals (voltages referred to a ground) and are proportional to the desired r.p.m. The position-control loops are closed by the dedicated CPU that is responsible for measuring the angular positions of the motors.

In more recent times there have been developed digital drives with speed-regulating and position-regulating functions organized according to the criteria represented in FIG. 2. In this case, the communication between the CPU 1, which generates the path, and the CPUs that control the position of the motors 6.1, ..., 6.n (the said CPUs being incorporated in the CPU of the digital drives 5.1, ..., 5.n) uses a field bus 3, 4, which transfers information in a digital way. The control loops are closed locally by the CPUs of the drives 5.1, ..., 5.n. The actual positions measured, together with other information, are sent to the CPU that handles the generation of the path for verification of the execution of the movement in progress and for diagnostics activities. Also in this case, associated to the field bus 3, 4 are respective demux 3a and mux 4 blocks.

With the above control architecture there is eliminated transmission of information in an analog form. However, also the above solution is not without its disadvantages.

For example, there does not in general exist a single CPU that performs position control. This means that no CPU that closes the position loops has complete knowledge of the overall status (positions, currents) of the entire machine. In general, the CPUs of commercially available drives perform simple control functions and have a "closed" software architecture which is far from suited to adjustments of the control action according to the applicational requirements.

Furthermore, any adjustment of the position control according to the applicational requirements is to be made on board the only CPU (namely, the CPU 1 of FIG. 2) that knows the overall status of the machine (angular positions and currents of the motors—if these are transmitted by the drives). The position control function is thus performed on two levels: drives (distributed regulation) and control electronics ("machine" regulation, adaptation of the control to the operating conditions and to the applicational requirements). The considerable advantage of having the position-control function performed by a single CPU is lost.

Finally, communication between the CPU and the drives uses a general-purpose field bus. This means that the information transmitted is subject to the rules of the protocol used. It may be difficult to guarantee that the information is sent and received in a synchronous way: the points that describe the position paths refer to the same instants in time but are received by the drives at different instants in times. This could introduce deformations in the actual path followed by the machine, the extent of which is a function of the communication on the BUS, the possible transmission delays, and their variability in time.

Accordingly, there is a need in the art for an improved control system for robots.

SUMMARY OF THE INVENTION

The purpose of the present invention is therefore to provide an improved robot-control architecture, such as may overcome the drawbacks and disadvantages delineated hitherto.

Generally, the present invention comprises a control system for robots provided with parts that are able to move according to paths determined as a result of the application of control signals to the motors. A control unit generates and controls these paths, while a drive unit generates the control signals used to control the motors according to the paths generated by said control unit. Additionally, a dedicated Ethernet or other type of network connects the control unit to the drive unit.

The control unit typically comprises at least two dedicated central processing units (CPUs), one of which performs a function of supervision and the other a function of generation and control of the paths. The CPUs are connected to one another via a bus or buses, for example of the peripheral component interconnect (PCI) type. The control signals may be either phase or voltage signals. Similarly, the feedback signals may be phase signals, current signals or position signals of the axes of said motors.

The drive unit operates according to a general feedback scheme, sending drive signals to, and receiving corresponding feedback signals from the motors. In one embodiment, the feedback signals comprise digital position signals generated via encoders.

According to the present invention, the above purpose is achieved thanks to a control architecture for robots having the characteristics referred to in the specification and claims which follow.

DETAILED DESCRIPTION OF THE INVENTION

Figure 1:
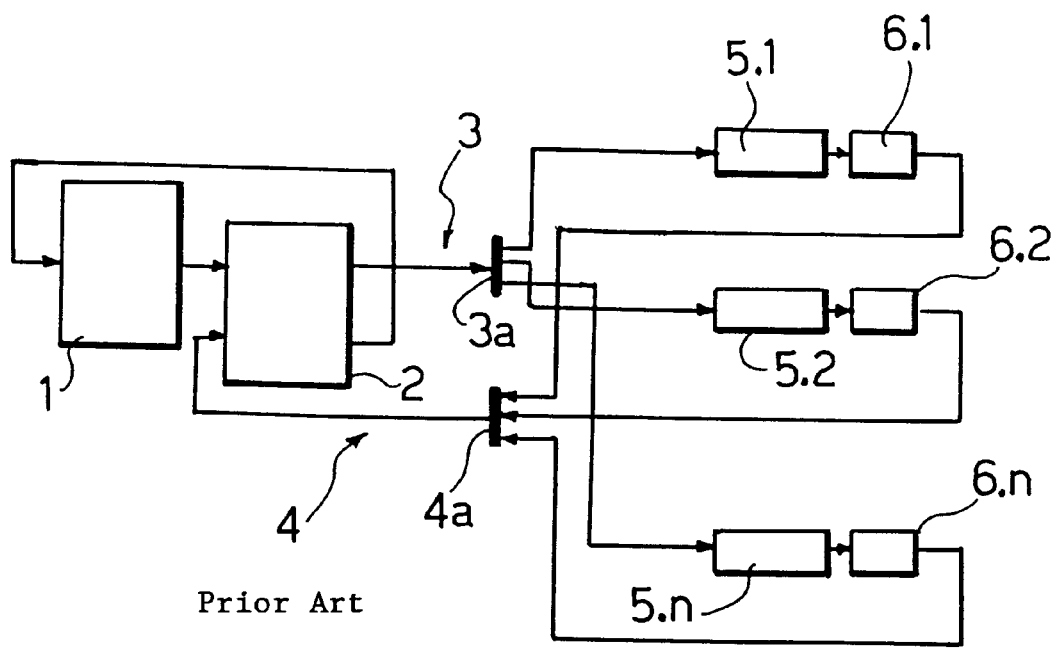
FIG. 1 displays a prior art control scheme for robots.
Figure 2:
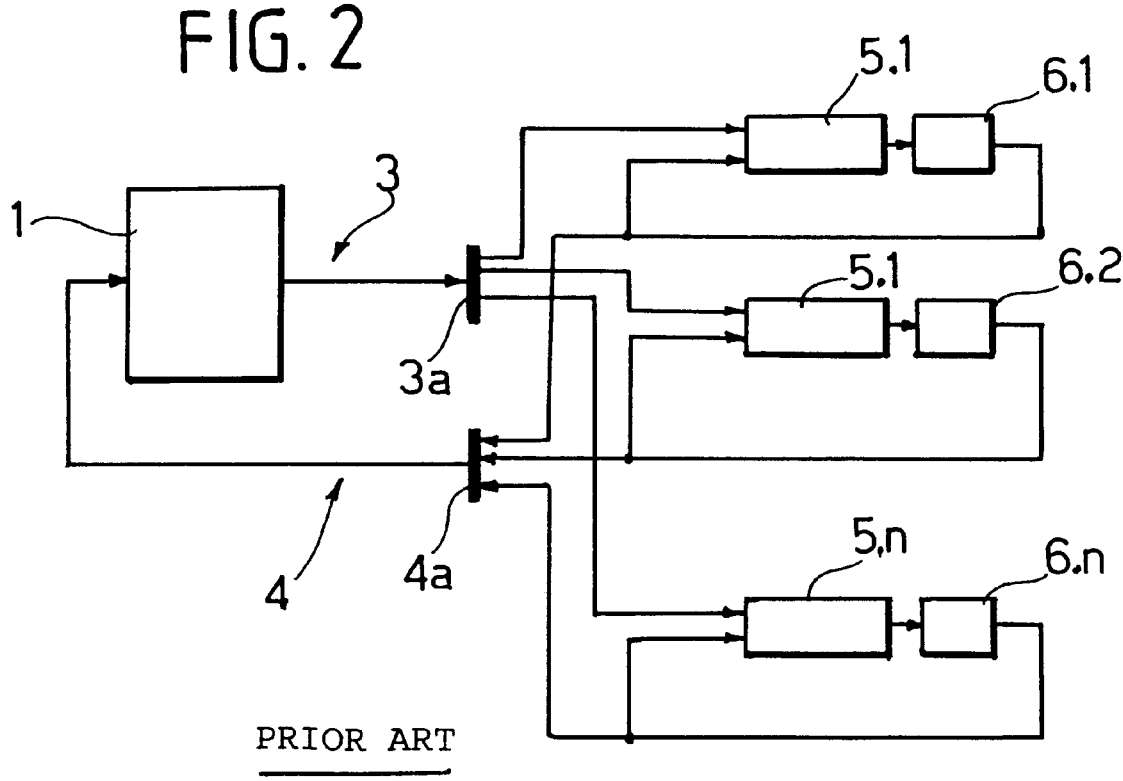
FIG. 2 displays a prior art control scheme for robots.
Figure 3:
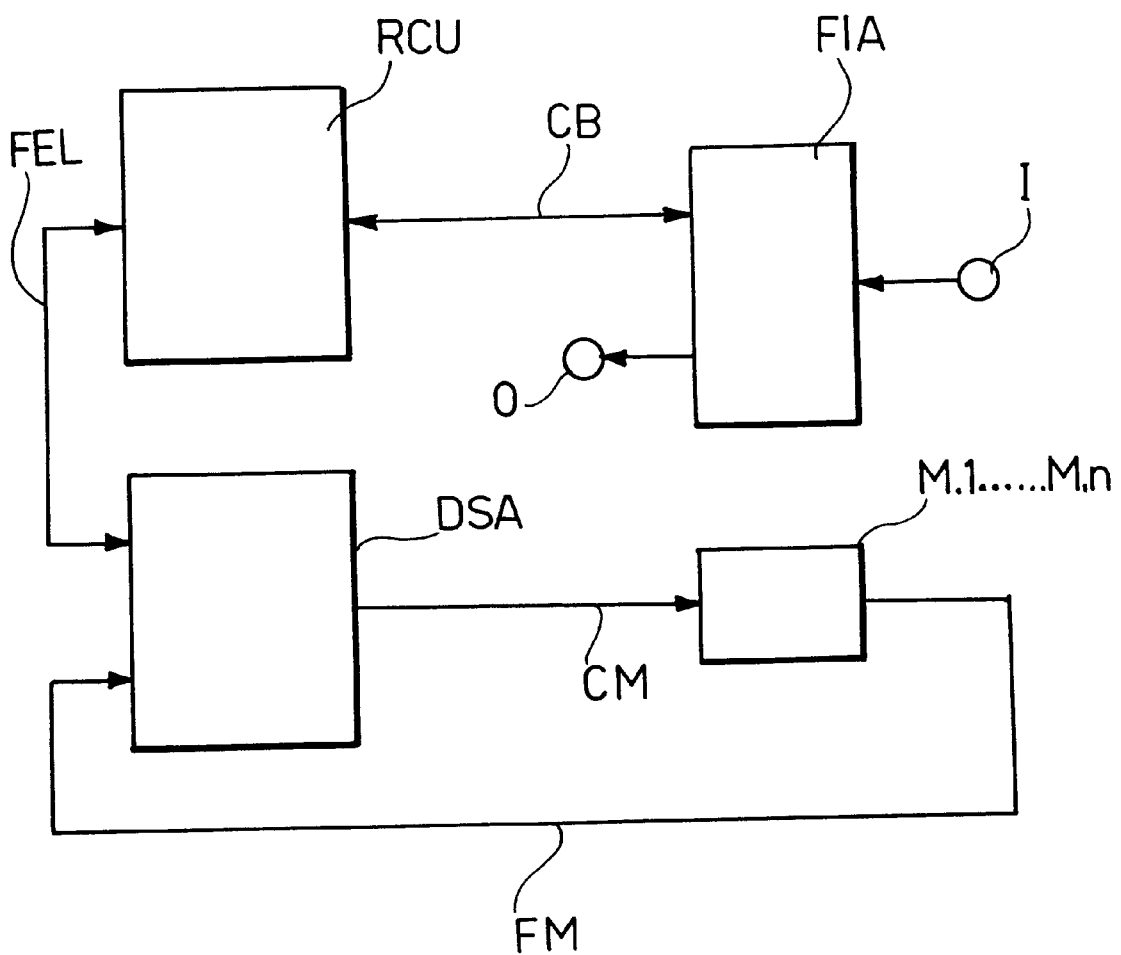
FIG. 3 displays a block diagram of the control architecture according to the invention.

The currently preferred embodiment of the invention envisages the use of two main functional units or blocks.

The first of these blocks is a robot control unit (RCU) which performs the supervision function and the function of path generation and control. This control unit advantageously envisages the use of two central processing units (CPUs) which perform the two functions and communicate with one another via bus, for instance of the PCI type.

DSA, instead, designates a second functional block consisting of a multi-axes drive unit, which provides the position-control loops, and the generation of the currents for the axes of the motors M. 1, ..., M.n. Present inside the drive DSA is the CPU responsible for the control of position and a number of CPUs (typically in the form of digital-signal processors—DSPs) which perform the closed-loop control of the currents by means of the generation of pulse-width modulation (PWM) signals for the power stages (inverters) and measurement of the phase currents of the motors. These control signals (phases and voltages of the motors) are transmitted to the motors M.1, ..., M.n themselves on a set of lines collectively designated by CM. The corresponding feedback signals (phases and currents of the motors, position of the axes obtained, for instance, by means of encoders) are sent back from the motors to the drive DSA through a complex of lines designated as a whole by FM.

The reference FIA designates an interface module which enables connection of the RCU to all the control peripherals (programming panel, operator interface, terminal, PC), i.e., to the distributed inputs/outputs (I/Os), to the conditioning signals for machine safety (safety chain), and to possible external control cards (PLC, additional devices and sensors). The corresponding connections are schematically designated by I (inputs) and O (outputs). The blocks FIA and RCU communicate by means of a bus CB consisting preferably of a CanBus. Characteristic of the block FIA is the possibility of being strictly personalized for the customer.

According to an important characteristic of the solution described, the connection between the units RCU and DSA consists of a 100-Mbyte/sec dedicated Fast Ethernet network. The network in question, designated by FEL, is in practice the communication channel between the CPU that generates the path and the CPU that carries out position control. A protocol (of a known type) is used which is particularly optimized for the application.

The main advantages that may be achieved with the introduction of the architecture according to the invention are described in what follows.

The use of the interface unit or module FIA makes for greater flexibility and configurability, according to the application, of the interface towards the user and of communication with the rest of the system.

Any transmission of information in the form of analog signals is eliminated as regards position control: the variables measured are digital (encoder positions), and the desired positions are floating-point variable ones transmitted via Ethernet, i.e., through the network FEL.

The CPU responsible for position control is inside the multi-axes drive (unit DSA) and communicates, within the drive, with the CPUs that close the current control loops (control of the torque generated by the motors): the position and speed loops are thus provided by a single CPU in the unit DSA which retains knowledge of the "global status" of the machine.

The position references and the other information necessary for position control are received in a single Ethernet data packet and are treated in a synchronous way by the CPU of the unit DSA, which processes them and closes all the position-regulation and speed-regulation loops at the same instant.

It is possible to transmit in a reliable way a lot of information for each controlled axis. This makes possible the performance of advanced control functions, with a sampling rate of just a few milliseconds, in which part of the processing is done by the CPU of the unit RCU that generates the path and receives information from additional sensors connected to the module FIA. Actuation is performed by the CPU of the drive unit, and Ethernet is the channel that enables the regulating loops to be closed. Consequently, the solution according to the invention enables a second-level control architecture to be obtained, which is flexible and configurable according to the applicational requirements and to the evolution of the product.

It is possible to obtain control architectures in which there are present one unit RCU and a number of units DSA responsible for the control action. This, for example, makes possible control architectures for two robots or else for one robot and a number of auxiliary axes.

The Ethernet network FEL makes it possible, without any losses in terms of performance, to provide set-ups for the robot-control system in which the multi-axes drive unit DSA is in the vicinity of the robot and the control unit RCU may be at some distance from the machine (for instance, it may be set at a distance of 50 meters from the robot).

Of course, without prejudice to the principle of the invention, the details of construction and the embodiments may vary widely with respect to what is described and illustrated herein, without thereby departing from the scope of the present invention.

What is claimed is:

1. A control system for robots provided with parts that are able to move according to paths determined as a result of the application of control signals to respective motors, comprising:
    a control unit for generating and controlling the aforesaid paths;
    a drive unit for generating said control signals for controlling said respective motors according to the paths generated by said control unit, said drive unit configured to receive from said motors position signals of a digital type, preferably generated via encoders; and
    a dedicated network of the Ethernet type for connection of said control unit with said drive unit.

2. The control system of claim 1, wherein said control unit comprises at least two dedicated central processing units, one of which performs a function of supervision and the other a function of generation and control of said paths.

3. The control system of claim 2, wherein said at least two central processing units are connected to one another via a bus or buses of the peripheral component interconnect type.

4. The control system of claim 1, wherein said drive unit operates according to a general feedback scheme, sending said control signals to said respective motors, and receiving from said motors corresponding feedback signals.

5. A The control system of claim 1, wherein said drive unit generates said control signals in the form of digital signals.

6. The control system of claim 5, wherein the digital signals are pulse width modulation signals.

7. The control system of claim 1, wherein said network is a network of the fast Ethernet type.

8. The control system of claim 1, wherein said network is a network with speed of transmission of the order of 100 Mbytes/second.

9. The control system of claim 1, further comprising an interface module for connection of said control unit with control peripherals and/or input/output units.

10. The control system of claim 9, wherein said control unit and said interface module communicate via a bus, such as a CanBus type bus.

11. The control system of claim 1 comprising said control unit connected, via an Ethernet-type network, to a plurality of said drive units.

12. The control system of claim 1, wherein said drive unit is set in the proximity of the respective robot, whilst said control unit is set in a position at a distance from said robot.

13. A control system for robots provided with parts that are able to move according to paths determined as a result of the application of control signals to respective motors, comprising:
    a control unit for generating and controlling the aforesaid paths;
    a drive unit for generating said control signals for controlling said respective motors according to the paths generated by said control unit, said drive unit operating according to a general feedback scheme, sending said control signals to said respective motors, and receiving from said motors corresponding feedback signals; and a dedicated network of the Ethernet type for connection of said control unit with said drive unit; and wherein said control signals comprise signals chosen in the set made up of phase signals and voltage signals for said motors, whilst said feedback signals are chosen in the set comprising phase signals, current signals and position signals of the axes of said motors.

14. A control system for robots provided with parts that are able to move according to paths determined as a result of the application of control signals to respective motors, comprising:

a control unit for generating and controlling the aforesaid paths;

a drive unit for generating said control signals for controlling said respective motors according to the paths generated by said control unit;

a dedicated network of the Ethernet type for connection of said control unit with said drive unit;

comprising an interface module for connection of said control unit with control peripherals and/or input/output units; and wherein said control peripherals are chosen in the set made up of a programming panel, an operator interface, a terminal, and a system personal computer, whilst said input/output units are chosen in the set made up of units for the generation of conditioning signals for safety, and external control cards, and additional devices and sensors.

15. A control system for robots provided with parts that are able to move according to paths determined as a result of the application of control signals to respective motors, comprising:

a control unit for generating and controlling the aforesaid paths;

a drive unit for generating said control signals for controlling said respective motors according to the paths generated by said control unit, said drive unit comprising;

a first CPU responsible for position control of said motors; and a set of further CPUs, each of which performs the function of closing the control loop of at least one respective motor, the arrangement being such that said first CPU retains knowledge of the global status of the robot; and a dedicated network of the Ethernet type for connection of said control unit with said drive unit.

* * * * *